United States Patent
Das et al.

(10) Patent No.: US 9,800,879 B2
(45) Date of Patent: Oct. 24, 2017

(54) METHODS AND SYSTEMS FOR REVERSIBLE MULTI-LAYER DATA HIDING

(71) Applicant: XEROX CORPORATION, Norwalk, CT (US)

(72) Inventors: Arindam Das, Konnagar (IN); Mahesh Ramasamy, Ariyalur (IN); Punitha Puttuswamy, Bangalore (IN)

(73) Assignee: Xerox Corporation, Norwalk, CT (US)

( * ) Notice: Subject to any disclaimer, the term of this patent is extended or adjusted under 35 U.S.C. 154(b) by 59 days.

(21) Appl. No.: 14/955,082

(22) Filed: Dec. 1, 2015

(65) Prior Publication Data

US 2017/0155916 A1    Jun. 1, 2017

(51) Int. Cl.
| | |
|---|---|
| *G06K 9/36* | (2006.01) |
| *H04N 19/36* | (2014.01) |
| *H04N 19/187* | (2014.01) |
| *H04N 19/136* | (2014.01) |
| *H04N 19/467* | (2014.01) |

(52) U.S. Cl.
CPC .......... *H04N 19/36* (2014.11); *H04N 19/136* (2014.11); *H04N 19/187* (2014.11); *H04N 19/467* (2014.11)

(58) Field of Classification Search
CPC ..... G06T 2201/0065; G06T 2201/0051; G06T 2201/0083; G06T 1/0021; H04N 21/8358; H04N 2201/3233; H04N 19/46; H04N 1/32144
See application file for complete search history.

(56) References Cited

U.S. PATENT DOCUMENTS

| | | | | |
|---|---|---|---|---|
| 2003/0185417 | A1* | 10/2003 | Alattar ................. | G06T 1/0064 382/100 |
| 2014/0026200 | A1* | 1/2014 | Ekberg ................. | H04L 9/3236 726/6 |

\* cited by examiner

*Primary Examiner* — Eueng-Nan Yeh
(74) *Attorney, Agent, or Firm* — Jones Robb, PLLC (57) ABSTRACT

Methods and systems for providing multi-layer reversible data hiding are disclosed. According to the methods and systems, multi-layer reversible data hiding process may be implemented in two stages. The first stage provides embedding of the sensitive data on a secret layer and hiding the secret layer behind single or multiple layers for secure transmission for intended recipient. Subsequently, the second stage is concerned about retrieving or extracting the hidden sensitive data through proper authentication. In the extraction process, the recipient needs to provide the right authentication code for each of embedded layer in order to reach to the secret layer. Upon unsuccessful authentication of any embedded layer, the proposed method enables an intelligent security technique termed as SMART (Suspect Malicious Activity on Rich Tract), which ensures to protect the sensitive data by suspecting the attempts of theft and intrusion.

24 Claims, 10 Drawing Sheets

| p,q | p,q+1 | p,q+2 | p,q+3 |
|---|---|---|---|
| p+1,q | p+1,q+1 | p+1,q+2 | p+1,q+3 |
| p+2,q | p+2,q+1 | p+2,q+2 | p+2,q+3 |

| (a,b) p,q | (a,b) p,q+1 | (a,b) p,q+2 | (a,b) p,q+3 |
|---|---|---|---|
| (a,b) p+1,q | (a,b) p+1,q+1 | (a,b) p+1,q+2 | (a,b) p+1,q+3 |
| (a,b) p+2,q | (a,b) p+2,q+1 | (a,b) p+2,q+2 | (a,b) p+2,q+3 |

FIG. 5D

| (a,b) p,q+4 | (a,b) p,q+5 | (a,b) p,q+6 | (a,b) p,q+7 |
|---|---|---|---|
| (a,b) p+1,q+4 | (a,b) p+1,q+5 | (a,b) p+1,q+6 | (a,b) p+1,q+7 |
| (a,b) p+2,q+4 | (a,b) p+2,q+5 | (a,b) p+2,q+6 | (a,b) p+2,q+7 |

METHODS AND SYSTEMS FOR REVERSIBLE MULTI-LAYER DATA HIDING

TECHNICAL FIELD

Broadly, the presently disclosed embodiments relate generally to methods and systems for data hiding, and more particularly, to methods and systems for multi-layer reversible data hiding in multimedia.

BACKGROUND

Conventionally, data hiding refers to a process of hiding data into multimedia for communication or some other use. Such processes may also be advantageous for secure transmission of secret data. The data hiding process typically combines two different sets of data: 1) a set of the embedded data, and 2) another set of the cover media data. Further, in such processes, invisibility of hidden data and successful recovery of the hidden data is an important requirement. However, in the conventional process of data hiding, the cover media, such as a cover image, may experience some distortion due to embedding of the secret data through various layers. Moreover, the distorted cover image can also indicate that there is some information or secret images have been embedded into the cover image. Therefore, such data hiding process for communication may not be acceptable in some domains that require secure communications, such as the military, medical, and legal domains.

Further to the data hiding process, there is another challenge to accurately reconstruct or recover the hidden secret data from the embedded cover image once the cover image has been transmitted to the intended receiver. Conventionally, the steps of hiding the secret data behind a cover image and recovering the secret data from the cover image are collectively referred as Reversible Data Hiding (RDH) techniques. Thus, conventional RDH technique recovers the original image without any distortion or with permissible limit of distortion after the secret data has been extracted.

Since the RDH technique does not guarantee the security of secret data, this creates additional challenges relating to the security of secret data that is embedded as a secret data layer and hidden behind the cover image. In order to overcome these problems, conventional encryption techniques are used on the secret data to ensure that any unauthorized person or intruder fails to access the secret data. Unfortunately, data encrypted with a majority of the state-of-the-art encryption techniques can be easily decrypted using widely available bypass filters. Thus, the encryption of the secret data using standard encryption techniques is not a viable solution to implement in a highly secured mechanism.

There are some state-of-art techniques divulging the data security by the way of self-destruction of the sensitive data itself. However, conventional data destruction is a random mechanism and it does not assure retrieval of the original data. Therefore, there is no assurance of reconstruction of the original data back to the user. In one conventional technique, the sensitive data is destructed after a one-time use. In that sense, the security mechanism on the sensitive data is nowhere preserved or kept.

Therefore, it would be advantageous to provide methods and systems for multi-layer reversible data hiding that enables authentication of multiple layers sequentially for accessing the secret data hidden behind the cover media.

It may also be advantageous to preserve and protect the sensitive data immediately after sensing the presence of an intruder.

It may be additionally advantageous to retrieve the sensitive data to the user upon providing proper layer wise authentication.

SUMMARY

This summary is provided to introduce concepts related to encoding and decoding stages of a multi-layer reversible data hiding method. This summary is neither intended to identify essential features of the claimed subject matter nor is it intended for use in determining or limiting the scope of the present disclosure.

An embodiment of the present disclosure provides a method for providing multi-layer reversible data hiding is disclosed. In this respect, the method for embedding data in a cover media includes providing a plurality of layers including a cover layer, one or more intermediate layers, and a data layer that includes hidden data. The method further includes selecting, based on a total number of the one or more intermediate layers and the data layer, a window size to process the layers. The method also includes validating each of said one or more intermediate and data layers in said cover layer based on said window size. The method further includes providing an authentication key for each of said layers. In this respect, the method further includes embedding each of said one or more intermediate and data layers in said cover layer based on said window size.

An embodiment of the present disclosure provides a method for extracting data from a cover media in a computing environment. The method includes receiving an authentication code corresponding to each of a plurality of layers associated with the cover media, wherein the plurality of layers includes a cover layer including said cover media thereon, one or more intermediate layers, and a final layer including hidden data thereon. The method further includes authenticating each of said layers based on the corresponding authentication code. The method also includes providing, upon successful authentication at each of said layers, the hidden data from said final layer. Further, the method also includes distributing, upon unsuccessful authentication at any of said layers, the hidden data among the one or more intermediate layers.

Another embodiment of the present disclosure provides a system for providing multi-layer reversible data hiding. The system includes an embedding module that is coupled to the processor, wherein the embedding module is configured to embed data in a cover media, wherein the cover media comprises a cover layer having said cover media thereon, a data layer having said data thereon, and a plurality of intermediate layers disposed between the cover layer and the data layer, wherein the embedding module is configured to embed each of said layers sequentially based on a window size of said cover media. The system further includes an authentication module coupled to the processor, wherein the authentication module is configured to provide an authentication key for each of the said layers. The system also includes an extraction module coupled to the processor, wherein the extraction module is configured to receive authentication key corresponding to each of said layers, and in response to the receiving, provide the data from said data layer upon successful authentication at each of said layers, and distribute said data among one or more of the layers upon unsuccessful authentication at any of said layers.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

It should be appreciated by those skilled in the art that any block diagrams herein represent conceptual views of illustrative systems embodying the principles of the present subject matter. Similarly, it will be appreciated that any flow charts, flow diagrams, and the like represent various processes, which may be substantially represented in computer readable medium and so executed by a computer or processor, whether or not such computer or processor is explicitly shown.

DETAILED DESCRIPTION

The following detailed description is made with reference to the figures. Preferred embodiments are described to illustrate the disclosure, not to limit its scope, which is defined by the claims. Those of ordinary skill in the art will recognize a number of equivalent variations in the description that follows.

DEFINITIONS

The expression 'LSBs' used hereinafter in the complete specification can refer to a least significant bit (LSB). The LSB is a bit position in a binary integer giving the units value, that is, determining whether the number is even or odd. The LSB sometimes may also be referred as a rightmost bit, due to the convention in positional notation of writing less significant digits further to the right.

The expression 'cover media' used hereinafter in the complete specification can refer to any kind of multimedia including images, video, or any combination to represent any text or message in integrated way.

These definitions are in addition to those expressed in the art.

Overview

The present disclosure provides methods and systems for providing multi-layer reversible data hiding for end users. The exemplary systems and methods can ensure safe and secure data protection during and even after the transmission of sensitive data to an intended recipient. The exemplary systems and methods provide a mechanism to identify the presence of any intruder or any malicious activity during the authentication process. The exemplary systems and methods provides a multi-layer reversible data hiding process in which each of the layers are password protected and required an authentication code to unlock each of the layers. In a scenario, when user fails to provide right authentication code or an intruder try to surpass the authentication process for any of the embedded layers, the exemplary systems and methods distributes the sensitive data, which is embedded on the secret layer, among all other layers randomly. In another scenario, when a user unintentionally provided the wrong authentication code or the user is not an intruder, the exemplary systems and methods rearranges the sensitive data on the secret layer and thereafter the intended recipient retrieve the sensitive data from the secret layer after proper authentication.

The exemplary systems and methods provide Reversible Data Hiding (RDH) processes in two stages. The first stage provides embedding of the sensitive data on a secret layer and hiding the secret layer behind single or multiple layers for secure transmission for intended recipient. Subsequently, the second stage is concerned about retrieving or extracting the hidden data through proper authentication. In the extraction process, the recipient needs to provide a correct authentication code for each of the embedded layers in order to gain access to the secret layer.

Figure 1:
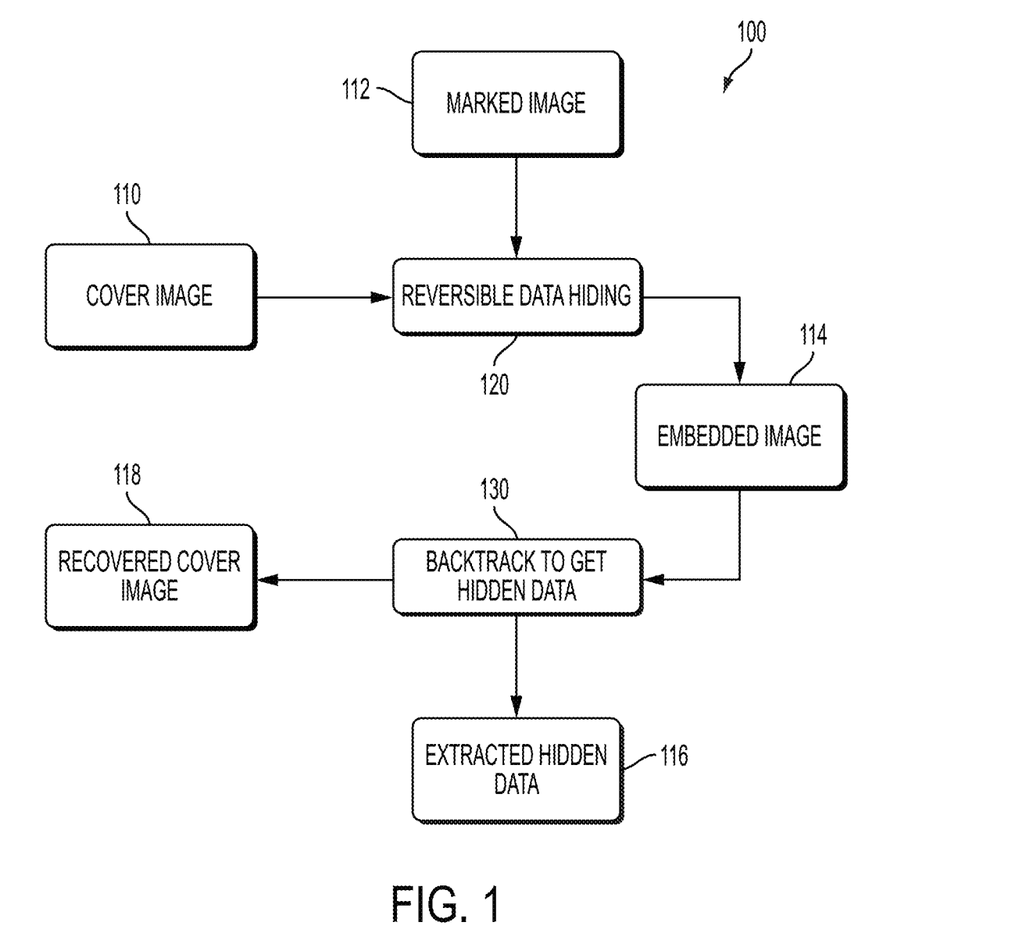
FIG. 1 illustrates an exemplary multi-stage approach of Reversible Data Hiding, according to an implementation of the present disclosure.

FIG. 1 illustrates an exemplary multi-stage approach 100 of Reversible Data Hiding, in accordance with an implementation of the present disclosure. The multi-stage approach 100 of Reversible Data Hiding may include two stages. The first stage may be referred as an image embedding stage, which allows hiding the single or multiple layers of sensitive data for secure transmission. The second stage can include an image extraction stage in which the hidden sensitive data is recovered through some proper authentication.

In one implementation, the first stage of the multi-stage approach 100, which may be referred as the image embedding stage, includes a cover image 110. The cover image 110 can be merged with marked layers by using the Reversible Data Hiding 120 technique. The marked layers include plurality of highly sensitive or underlying layers. The sensitive data is embedded into the last layer, which is a secret layer. Thereafter, all the layers are embedded into a single embedded layer, which is represented by the embedded image 114. The embedded image 114 may be pictorially represented by the cover image 110.

Further, in the image embedding stage, the fitness of each of the layers may be tested before embedding the layers. The fitness of the layer is tested to ensure that the dimension of the underlying layer does not exceed the cover image 110. Further, each of the layers is provided with an authentication key for embedding, and each of the authentication keys is unique to the specific layer. All the layers are encrypted with their corresponding authentication key except the cover layer.

In another implementation, the second stage of the multi-stage approach 100, which may be referred as the image extraction stage, includes the embedded image 114. In the image extraction stage, the embedded image 114 passed through the exemplary reversible data hiding 120 techniques to get the hidden sensitive data 130. This process extracts the recovered cover image 118 and the marked layers separately in order to retrieve the highly sensitive extracted hidden data 116. Therefore, the second stage is responsible to access the extracted hidden data 116 from the recovered cover image 118.

Further, in the image extraction stage, the intended receiver needs to provide the appropriate authentication code for each of the layers in order to reach to the secret layer. If at any layers, any of the authentication code is found to be incorrect, then the hidden sensitive data on the secret layer is distributed among all other layers. This helps to protect the sensitive data from any intruder or any malicious activities. However, in a scenario when a user unintentionally provided the wrong authentication key, then the embedded image can be returned to the sender to rearrange the distributed secret data. Thereafter, the embedded cover image 110 can again be provided to the intended recipient to extract the hidden sensitive data upon successful authentication.

Figure 2:
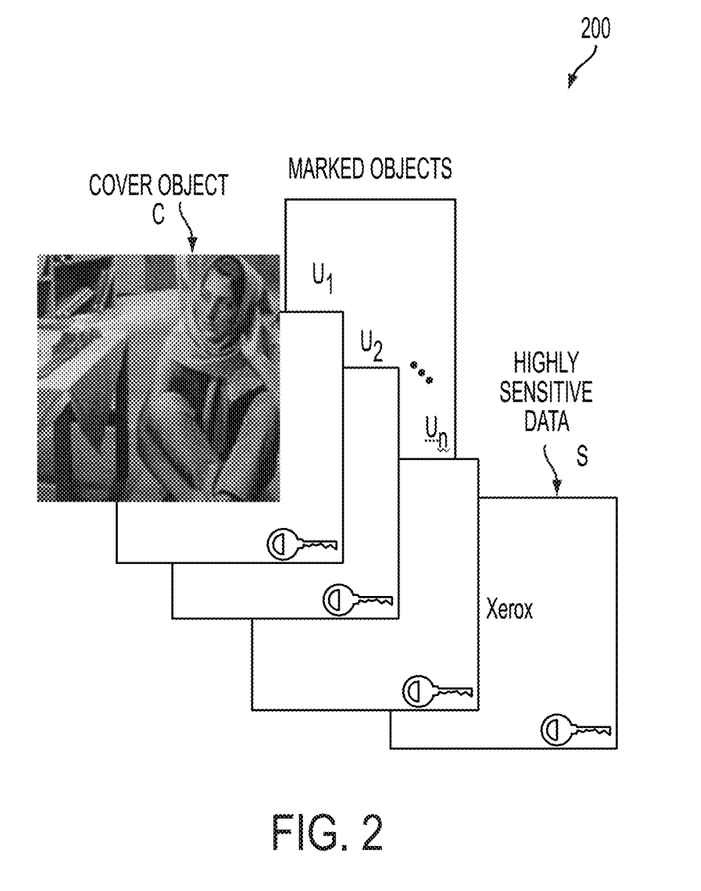
FIG. 2 illustrates an exemplary model of an exemplary multi-stage approach of Reversible Data Hiding, according to an implementation of the present disclosure.

FIG. 2 illustrates an exemplary model 200 of an exemplary multi-stage approach of Reversible Data Hiding, according to an implementation of the present disclosure. The cover object is the gray scale cover image C of the dimension P×Q such that $C(p, q) \in [0, 255]$, where $0 \leq p \leq P$; $0 \leq q \leq Q$. Further, the cover image C is followed by n-number of underlying layers $U_1, U_2 \ldots U_n$ and the secret layer S having the highly sensitive data. Further, the marked objects are underlying images referred as U, which is of dimension M×K or such that $U(m, k) \in [0, 1]$, where $0 \leq m \leq M$; $0 \leq k \leq K$. Furthermore, the highly sensitive data S is of the dimension R×T such that $S(r, t) \in [0, 1]$, where $0 \leq r \leq R$; $0 \leq t \leq T$. Each layer is protected with an authentication code by the sender of the sensitive data S. Once the image data is transmitted to the intended recipient, the recipient is able to extract the highly sensitive data S after the successful authentication of each of the embedded layers. In case of the unsuccessful authentication attempt, further details are explained in detail with respect to FIG. 3.

Figure 3:
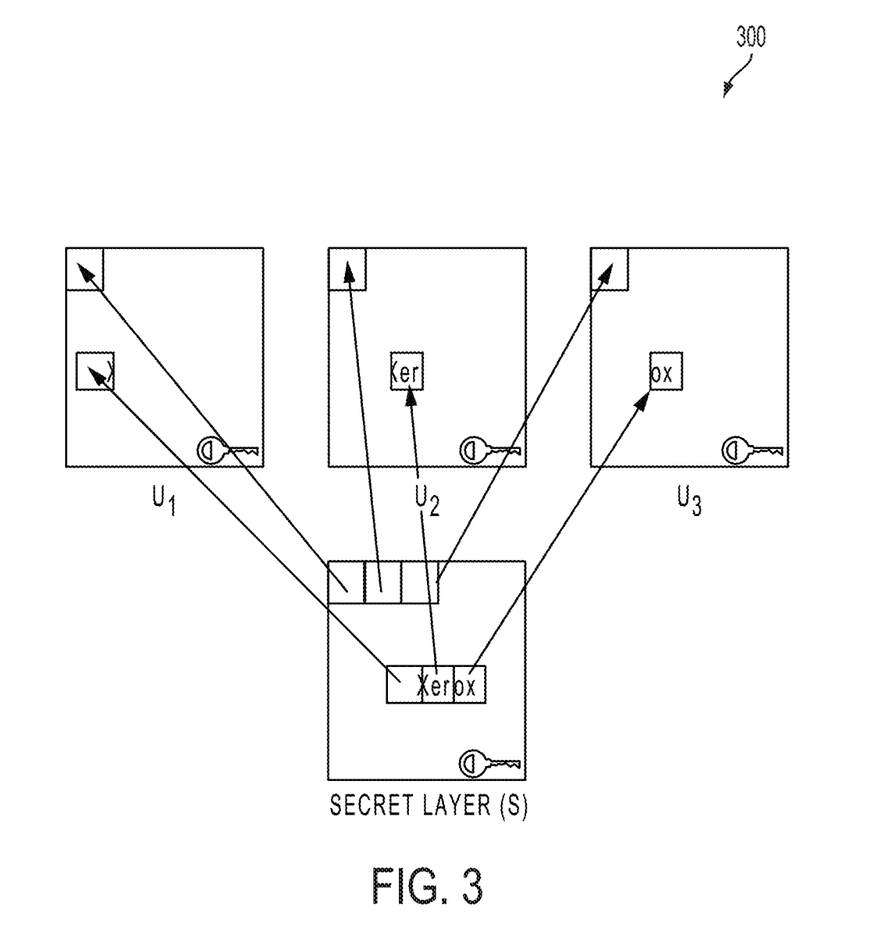
FIG. 3 illustrates an exemplary approach to preserve and protect sensitive data immediately after sensing the presence of an intruder, according to an implementation of the present disclosure.

FIG. 3 illustrates an exemplary approach 300 to preserve and protect the sensitive data immediately after sensing the presence of an intruder, according to an implementation of the present disclosure. As explained in FIG. 2, each layer is protected with the authentication code by the sender of the sensitive data. Upon an unsuccessful authentication attempt, sensing the presence of an intruder, or any malicious activities the highly sensitive data at the secret layer S is distributed randomly among all other underlying layers $U_1$, $U_2 \ldots U_n$. As illustrated in FIG. 3, the secret data, for example, 'XEROX,' which is embedded at the secret layer S, is distributed randomly among three different underlying layers $U_1$, $U_2$ and $U_3$ upon an unsuccessful authentication attempt. In this way the secured data cannot be accessed by any unauthorized person. However, there may be a situation when the authorized user has provided a wrong authentication code unintentionally. In such a situation, the embedded sensitive image needs to be returned to the sender to rearrange the distributed secret data and re-send the image to intended recipient. Thereafter, the recipient may retrieve the sensitive data after proper authentication. An exemplary process of multi-layer sensitive data embedding is explained in further detail with respect to FIG. 4.

Figure 4:
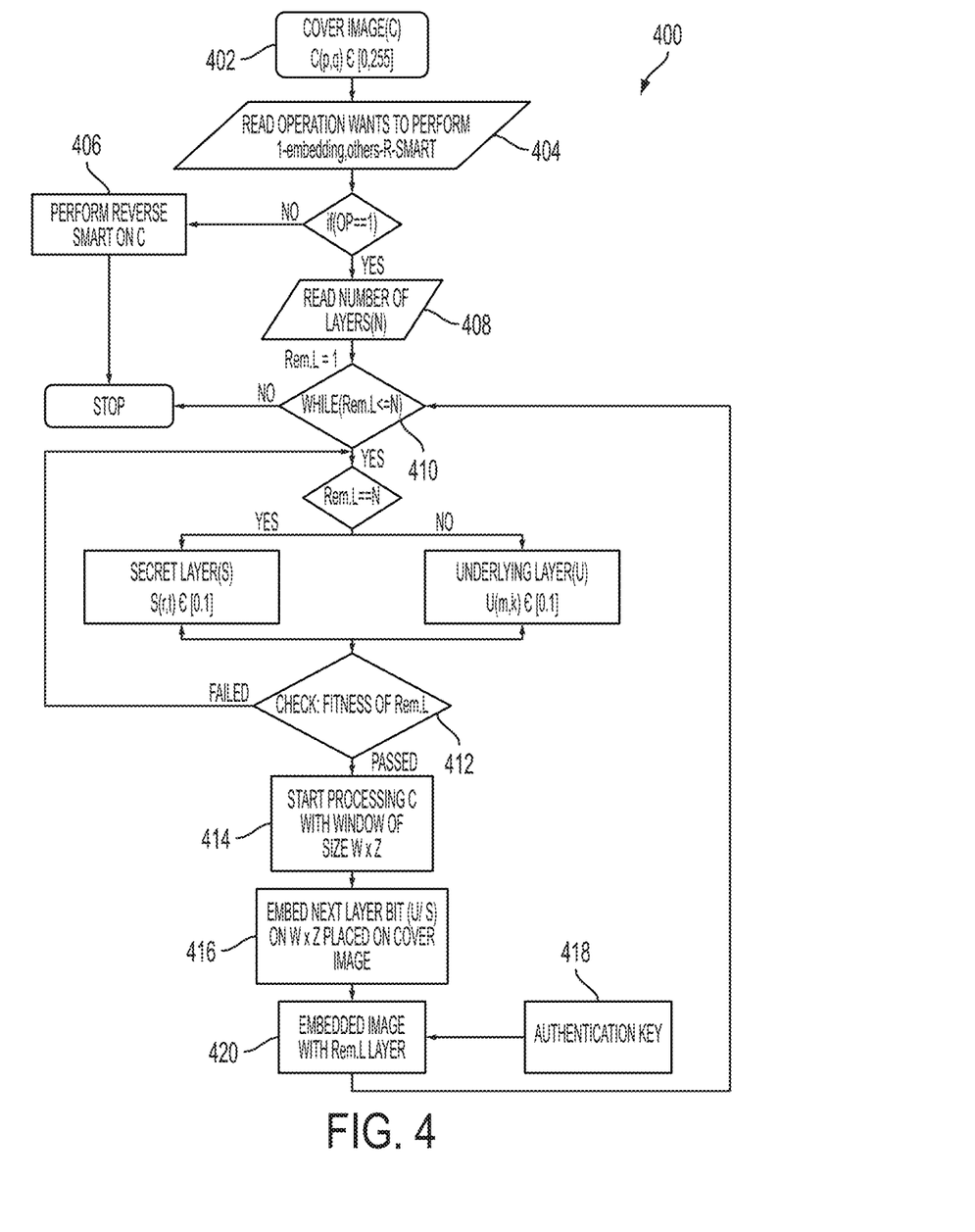
FIG. 4 is a flowchart illustrating a method of multi-layer sensitive data embedding, according to an implementation of the present disclosure.

FIG. 4 is a flowchart 400 illustrating a method of multi-layer sensitive data embedding, according to an implementation of the present disclosure. The multi-layer may include a cover layer, a plurality of intermediate layers, which may be referred to as underlying layers, and the secret layer. In an embodiment, the last layer may be considered as the secret layer and the intermediate layers are the underlying layers. To illustrate an exemplary implementation of the embodiments, the exemplary method is performed using 6-underlying layers including the secret layer. Therefore, it may be referred as a 6-layer reversible data hiding method. In this respect, 6-layer may be considered as the maximum number of layers in the example. However, the embodiments are intended to include or otherwise cover the exemplary data hiding techniques using any number of layers. Furthermore, the exemplary method at step 410 may use a counter Rem. L. The counter 410 may increment by one after embedding each of the layers until the maximum number of layers (N) is reached. Further, at step 414, a window of W×Z dimension may be selected to process the cover image C, wherein the value of Z may directly depend on the total number of layers to be embedded. The value of Z may be determined by the following equation:

$$Z = 1 + \left[ \frac{\text{Total number of layers to embed}}{\text{Number of } LSBs \text{ consider to embed data}} \right]$$

In the present example, there are a total of 6-underlying layers to be embedded including the secret layer and the value of W may be, for example, 3. In order to calculate the value of Z, the total number of layers to embed is six divided by the number of LSB's considered to embed data (which is always 2 as the exemplary techniques embed the data only at the last 2 LSB's). Hence, the window size of 3×4 may be considered to process the cover image C which can be identified at step 402. Further, at step 412, the fitness of each of the layers may be tested before embedding the layer. In this respect, the fitness of each of the layers may be tested to ensure that the dimension of the underlying layers including the secret layer does not exceed the dimension of the cover image. The fitness test 412 of each of the layers may be tested by the following equation:

$$\left(\left(\frac{P}{W} \times \frac{Q}{Z}\right) \times W\right) \leq ((M \times K) + \text{size } (M \times K) + \text{size (Authentication Key)})$$

Further, at step 412, if the fitness test inequality by the above equation for each of the layers is true, then the underlying layer is typically not qualified to be embedded to the cover image since the dimension criteria fails. Further, each of the layers is provided with an authentication key 418 for embedding at step 420. The process of embedding the authentication key 418 for a number of underlying layers including the secret layer is provided in greater detail in FIG. 4A and FIG. 4B.

Figure 4A:
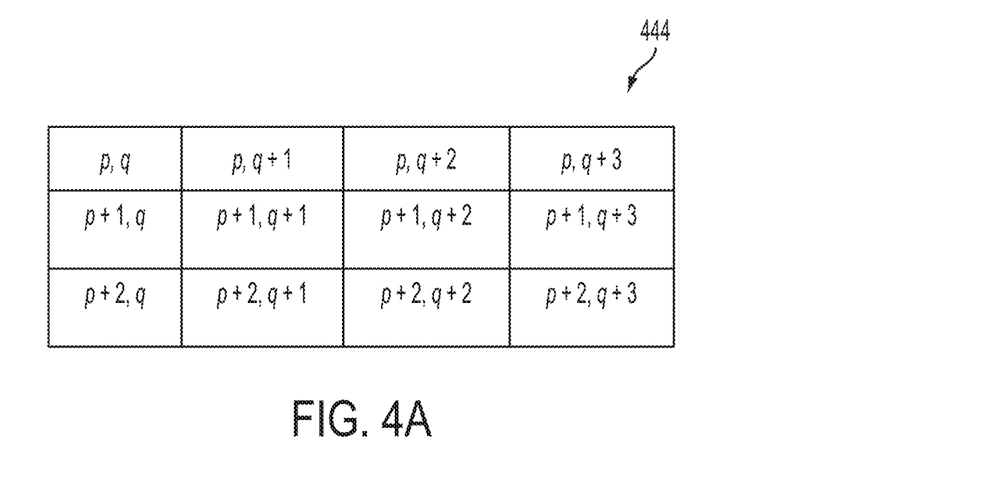
FIG. 4A illustrates an exemplary window position on a cover image (C), according to an implementation of the present disclosure.

Furthermore, in the present implementation, FIG. 4A provides a window position 444 of the cover image C which provides the 3×4 window dimension as calculated previously. The pixel positions in the 3×4 window dimension are provided by p, q. Depending on the 2 LSBs at the positions, {(p, q), (p+1, q), (p+2, q)} which may be 00, 01, 10, and 11, the LSBs/second last bit of {(p, q+3), (p+1, q+3), (p+2, q+3)} is modified. Further, the modification also depends on the value (0/1) in the underlying layer or the secret layer, whichever is being embedded.

TABLE 1

Pattern for embedding and extracting the bits of (U(m, k)/S(r, t))

| 2 LSBs of C(p, q) from | The value of underlying/secret layer (U(m, k)/S(r, t)) | | |
|---|---|---|---|
| W × 1 | 0 | 1 | |
| 00 | 0 | 1 | Change made to the LSB of C(p, q + 3) |
| 01 | 1 | 0 | |
| 10 | 0 | 1 | |
| 11 | 1 | 0 | |

For example, if 2 LSBs of C(p, q) and an input bit of U/S are matched with the pattern provided in the above Table 1, then the LSB of C(p, q+3) may be changed according to the pattern. Similarly, the comparison may happen for C(p+1, q) and C(p+2, q) and necessary changes may be made at the LSBs of C(p+1, q+3) and C(p+2, q+3). At the completion of the first window processing, the window will slide to the next non-overlapping block where the top-left position will be E(p,q+4) and the bottom-right position will be E(p+2, q+7).

Further, in the present embodiments, the above-mentioned embedding step successfully completed the embedding of one underlying image on the cover image. In this respect, the same logic may be applied to embed the second underlying image on the second underlying layer. Therefore, the modification may be at the second last LSBs of C(p, q+3), C(p+1, q+3) and C(p+2, q+3). The above pattern with last 2 LSBs of C(p, q), C(p+1, q) and C(p+2, q) may be compared with the incoming bit from U(m+3, k)/S(r+3, t), U(m+4, k)/S(r+4, t) and U(m+5, k)/S(r+5, t), respectively.

Figure 4B:
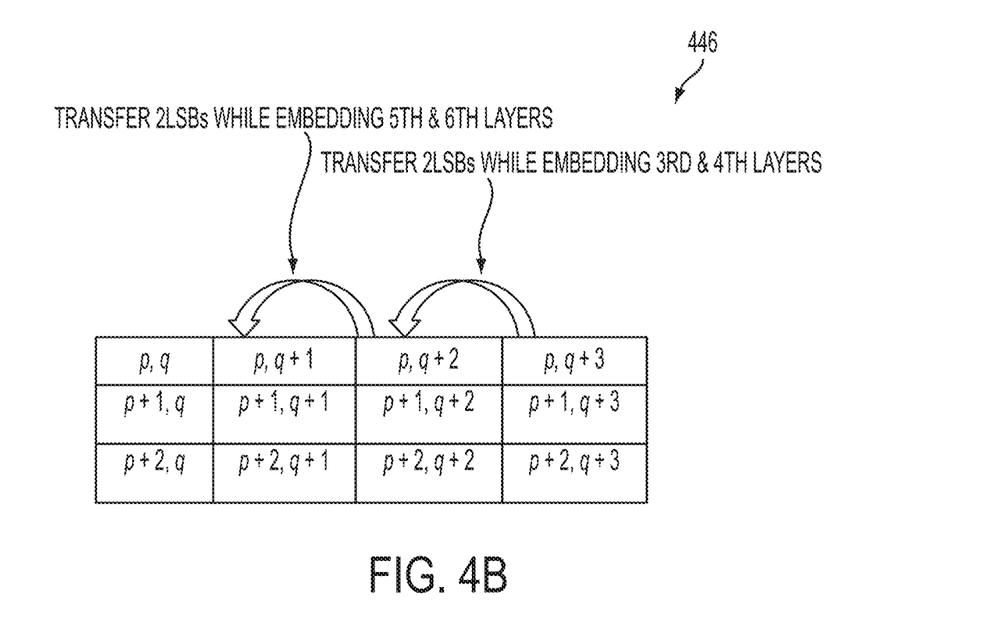
FIG. 4B illustrates an exemplary embedding process illustrating the shifting and replacing of cover image's 2 LSB's to left direction to embed a subsequent layer's bit, according to an implementation of the present disclosure.

FIG. 4B is an exemplary embedding process 446 illustrating the shifting and replacing of cover image's 2 LSB's to left direction to embed s subsequent layer's bit, according to an implementation of the present disclosure. Since the first and second underlying layer is embedded in the above example, embedding the third underlying layer will be explained. In this respect, before embedding the input bit, the 2 LSBs of C(p, q+3), C(p+1, q+3) and C(p+2, q+3) may be transferred and replaced with the 2LSBs of C(p, q+2), C(p+1, q+2) and C(p+2, q+2) as provided in the FIG. 4B. The same logic may be followed to embed the $4^{th}$, $5^{th}$ and $6^{th}$ layer, respectively.

Further, again referring back to FIG. 4, which shows the exemplary system's flow while performing the multi-layer data embedding, Rem. L is the counter, which may get incremented by one after embedding each layer up to the maximum number of layers N, such as Rem, L=N.

Figure 5:
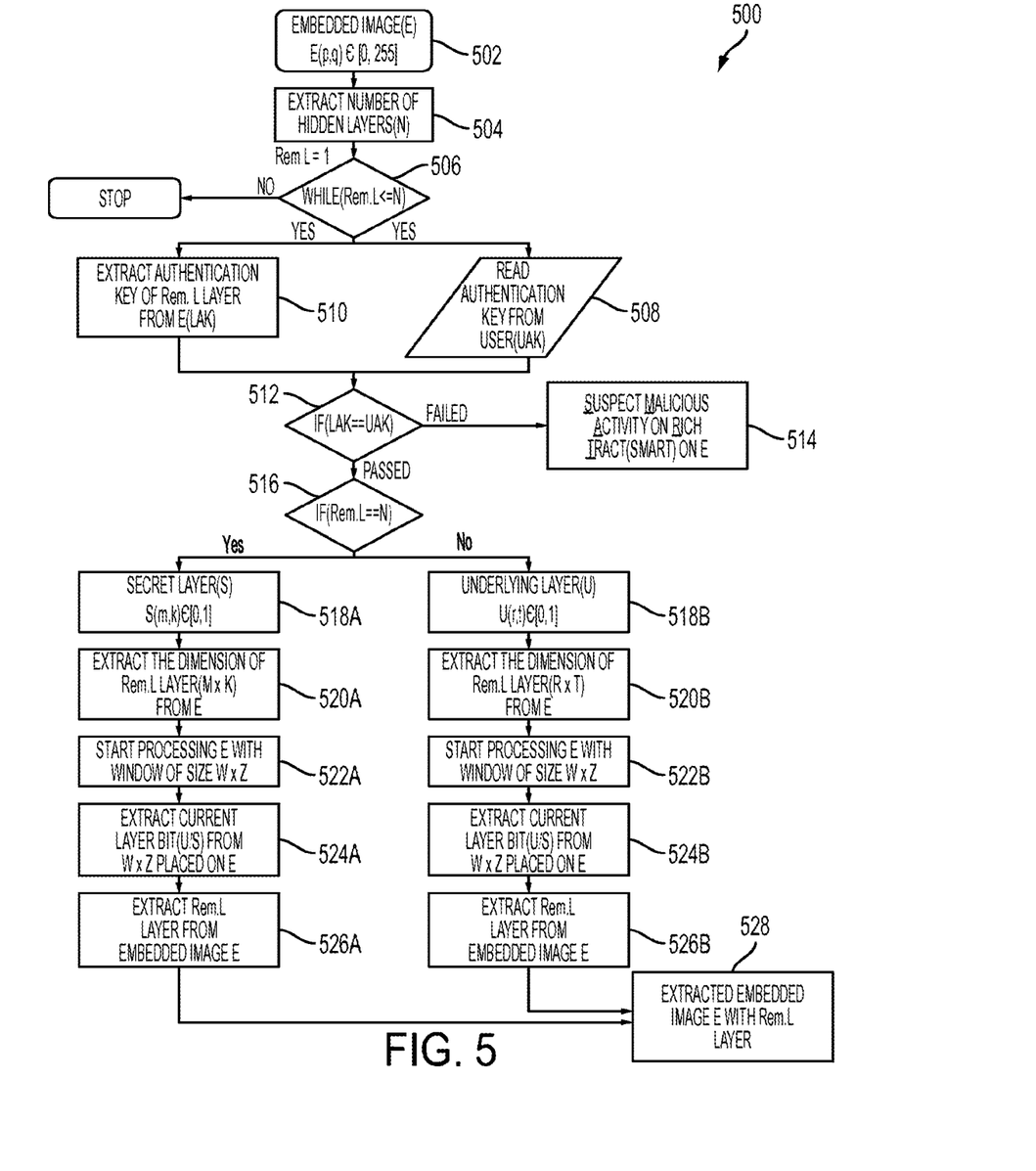
FIG. 5 is a flowchart illustrating a method of extracting the embedded sensitive data from a secret layer, according to an implementation of the present disclosure.

FIG. 5 is a flowchart 500 illustrating a method of extracting the embedded sensitive data from a secret layer, according to an implementation of the present disclosure. The extracting process may include checking the dimension of the embedded image E at step 502. Further, at the step 502, the step may include taking the embedded image of dimension P×Q such that E(p, q) ∈[0, 255], where 0≤p≤P; 0≤q≤Q. At step 504-516, the method may include extracting the number of hidden layers (N) such that the number of underlying layers (U) including the secret layer (S) and the authentication key to match with the key entered by the user from the receiver's end for the underlying layer. The exemplary method may use a counter Rem. L. At step 506, the counter may increment by one after extracting each of the layers until the maximum number of layers (N) is reached at step 516. Upon comparison of authentication code at step 512, if the authorized user provides an exact match of the authentication code, the process may extract the secret layer S at step 518A, and the underlying layer U at step 518B. Further, in this respect, the process may extract the dimension M×K for underlying layer at step 520A or the dimension R×T for secret layer, at step 520B, as applicable from the embedded image E.

Further, similar to the embedding process, at steps 522A-522B, the exemplary window processing method may also be applicable on the embedded image E during the extraction process. Subsequently, at steps 524A-524B, the process may extract the current layer bit (U/S) for the dimension W×Z placed on the embedded image E. Further, at steps 526A-526B, the process may extract Rem. L layer from the embedded image E. Finally, at step 528, the process may extract embedded image E with Rem. L layer. Further, the extraction process is explained in more detail in the following FIGS. 5A-5B.

Figure 5A:
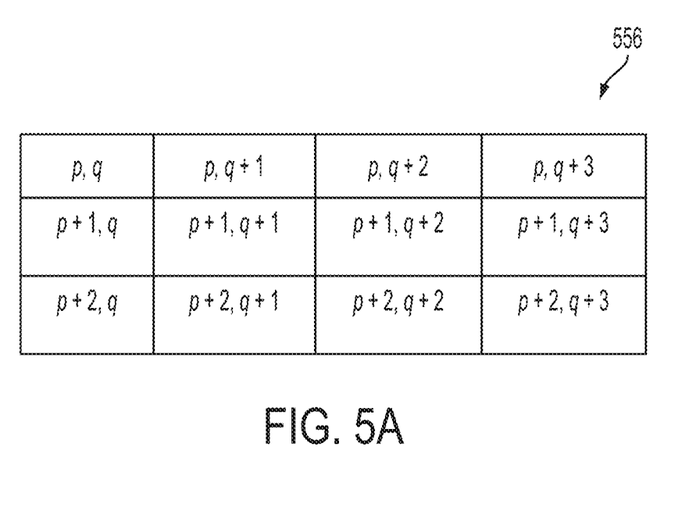
FIG. 5A illustrates an exemplary window position of an embedded image (E), according to an implementation of the present disclosure.

For example, consider 2 LSBs of E(p, q) and LSB of E(p, q+3) as provided in FIG. 5A, which is an exemplary window position 556 of an embedded image (E), according to an implementation of the present disclosure. Upon analyzing 2 LSBs E(p, q) and an LSB of E(p, q+3), the exemplary system finds the pattern as provided above in Table 1. Next, the method extracts the corresponding bit that was embedded during the embedding process. Thus, the exemplary system extracts the first underlying layer while following the steps as described of the exemplary process. Likewise, to extract the second underlying layer, the exemplary system considers 2 LSBs of E(p, q) and second last bit of E(p, q+3) and finds the corresponding pattern as provided above in Table 1. Similarly, the system extracts the corresponding bit that was embedded during the embedding process.

Figure 5B:
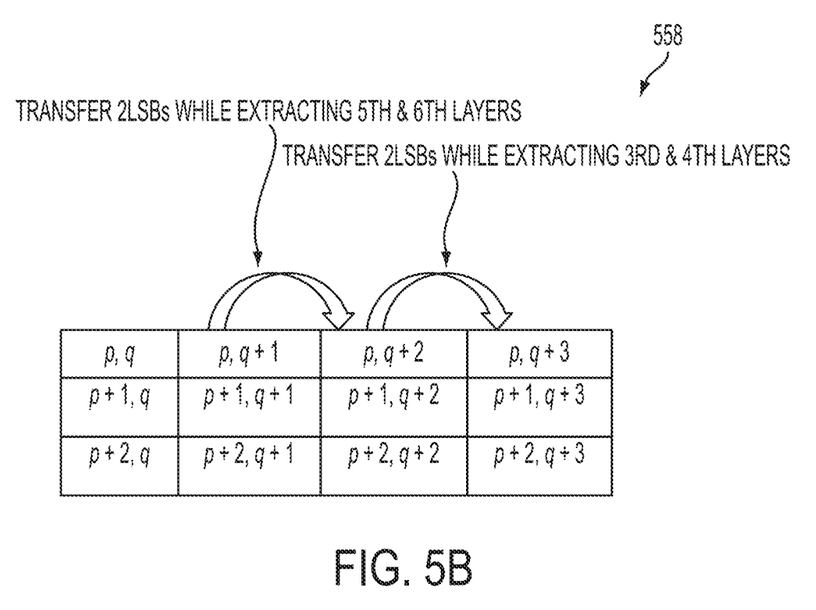
FIG. 5B illustrates an exemplary extraction process illustrating the shifting and replacing of embedded image's 2 LSB's to right direction to extract subsequent layer's bit, according to an implementation of the present disclosure.

Furthermore, in the present implementation, FIG. 5B is an exemplary extraction process 558 illustrating the shifting and replacing of embedded images 2 LSB's to the right direction to extract a subsequent layers' bit, according to an implementation of the present disclosure. For example, to extract the third underlying layer, the exemplary system may shift the 2 LSBs of E(p, q+2), E(p+1, q+2), E(p+2, q+2) to the 2 LSBs of E(p, q+3), E(p+1, q+3) and E(p+2, q+3) as provided in FIG. 5B, consider the 2 LSBs of E(p, q) with LSB of E(p, q+3), and find the appropriate pattern as provided in above Table 1. Likewise, the exemplary system applies the same logic as explained above to extract the $4^{th}$, $5^{th}$ and $6^{th}$ layer, respectively.

Figure 5C:
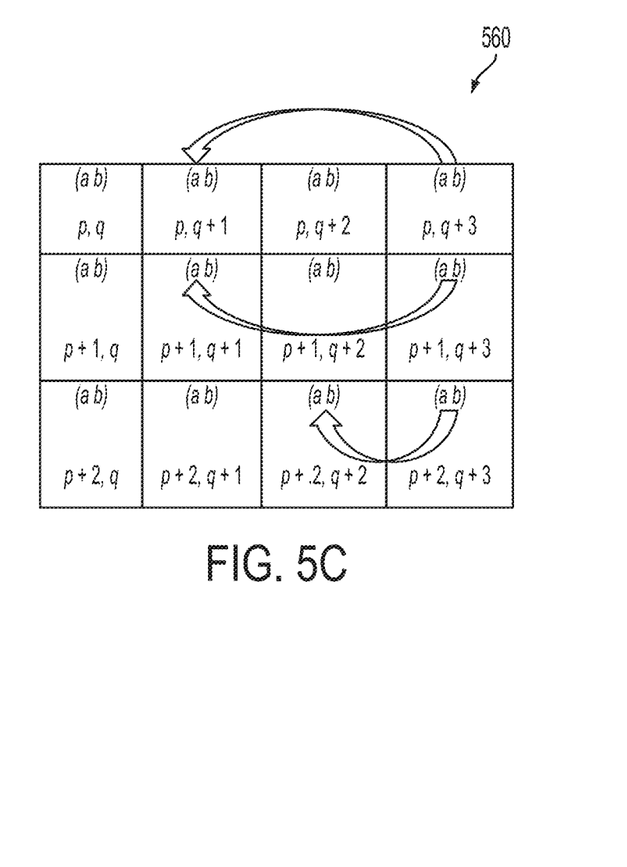
FIG. 5C illustrates an exemplary sensitive data distribution/exchange among other layers for first window processing, according to an implementation of the present disclosure.

In one embodiment, during an extraction stage, the recipient needs to provide the correct authentication code for each of the embedded layers to get to the last layer, i.e., the secret layer. During the authentication process, if any of the authentication code for any of the layers do not match or are incorrect, then the exemplary system automatically splits the secret data which is embedded on the secret layer and distribute it among all other layers randomly, refer again to the FIG. 3. In this respect, FIG. 5C is provided as an exemplary sensitive data distribution/exchange 560 among other underlying layers for first window processing, according to an embodiment of the present disclosure. The present technique may also be referred to as a Suspect Malicious Activity on Rich Tract ("SMART") algorithm and the feature to make the distributed secret data rearrange is can be termed an "R-SMART" (Reverse-SMART) algorithm. This approach may be based on the concept of detecting the presence of an intruder. In this embodiment, the dimension of the window may be taken of same size which is taken into the consideration while extracting the underlying layer.

Further referring back to the FIG. 5A which is an exemplary window position 556 of an embedded image (E), according to an embodiment of the present disclosure. In that window position 556 of the embedded image E, the secret data may be stored only at the second last bit of E(p, q+3), E(p+1, q+3) and E(p+2, q+3), respectively.

In the present implementation, it may be noted that the second last bits of E(p, q+1), E(p+1, q+1), and E(p+2, q+1) may refer to the information of the first underlying layer, and, the last bits of E(p, q+1) E(p+1, q+1), and E(p+2, q+1) may refer to the information of the second underlying layer. Likewise, the second last bit of E(p, q+2), E(p+1, q+2), and E(p+2, q+2) may refer to the information of the third underlying layer and the last bits of E(p, q+2), E(p+1, q+2), and E(p+2, q+2) may refer to the information of fourth underlying layer. Furthermore, the last bits of E(p, q+3), E(p+1, q+3), and E(p+2, q+3) may refer to the information of fifth underlying layer.

TABLE 2

SMART enabled data split logic table

| $2^{nd}$ last bit of the right most col. of 3 × 4 window on (E) | $2^{nd}$ last/last bit of underlying layer | Replace $2^{nd}$ last bit of right most col of 3 × 4 window on (E) |
|---|---|---|
| 0 | 1 | 1 |
| 1 | 0 | 1 |
| 1 | 1 | 0 |
| 0 | 0 | 0 |

Further, refer to the FIG. 5C which provides the possible outcome 560 when the exemplary system starts the window processing (3×4) on the embedded image E for secret data distribution among all other underlying layers. For example, assign a and b as the last two bits of the embedded image E at various positions defined by p and q, as provided in the FIG. 5C. Further, referring to Table 2 where the bit exchange, while facilitating the distribution of secret data, may directly depend on the XOR operation, there may be the following scenarios for bit exchange:

a) If the second last LSBs of E(p, q+3) is 0 and second last LSB of E(p, q+1) is 1 then replace E(p, q+3) by 1;
b) If the second last LSBs of E(p, q+3) is 1 and second last LSB of E(p, q+1) is 0 then replace E(p, q+3) by 1;
c) If the second last LSBs of E(p, q+3) is 1 and second last LSB of E(p, q+1) is 1 then replace E(p, q+3) by 0;
d) If the second last LSBs of E(p, q+3) is 0 and second last LSB of E(p, q+1) is 0 then replace E(p, q+3) by 0.

Likewise, the exemplary system may also apply the same logic and operation for the location E(p+1, q+3), E(p+2, q+3) and compare with E(p+1, q+1), E(p+2, q+2), respectively.

Figure 5D:
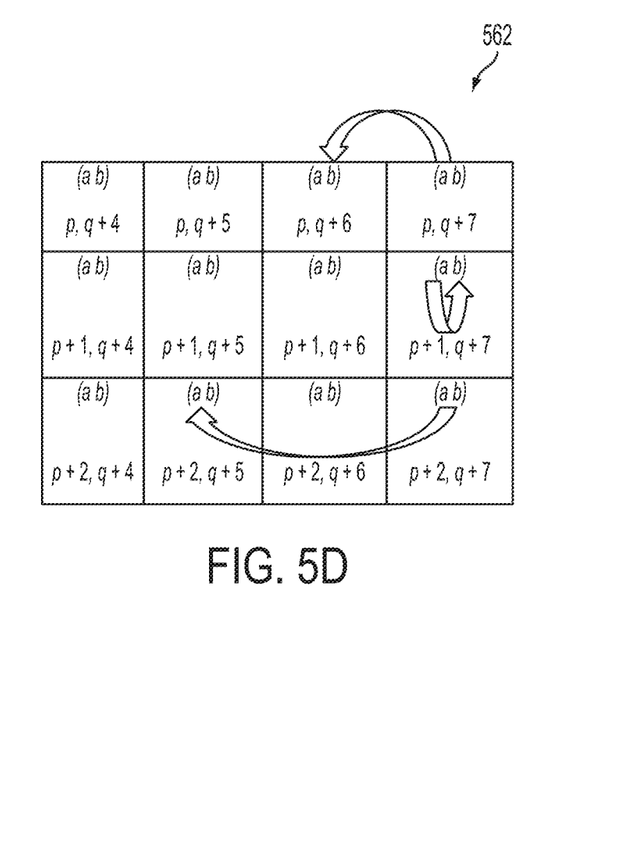
FIG. 5D illustrates an exemplary sensitive data distribution/exchange among other layers for second window processing, according to an implementation of the present disclosure.

After completing the first window processing as provided in FIG. 5C, the window may be placed on the position shown in FIG. 5D. FIG. 5D is an exemplary data distribution/exchange 562 among other layers for second window processing, according to an implementation of the present disclosure. In the second window processing, the exemplary system may analyze which underlying layers are unused in the previous window processing, which in the present example is the first window processing. Therefore, after a previous window processing, the system may identify such unused underlying layers and start applying the R-SMART distribution algorithm to those unused layers before applying the R-SMART algorithm to the layers that have already been used. In the embodiment, the exemplary system may indicate that the fourth layer is unused in the previous window processing. Therefore, in the second window processing, the exemplary system may start distributing the secret data from the fourth layer, then with the fifth layer, and again with the first underlying layer as illustrated in the FIG. 5D. When the secret data becomes completely distributed among all other underlying layers as per the Table 2, then the distribution stage may be referred as 'Completion of One Iteration' (COI). Further, the number of window processes needed to complete one iteration may be defined by below equation:

$$N_W = \left\lceil \frac{M_L}{W_R} \right\rceil$$

where
$N_w$ is the number of window processing needed for COI,
$M_L$ is the maximum number of underlying layers, which includes the secret layer within the current window, and
$W_R$ is the number of secret bits to be distributed within the current window. For example, in the exemplary implementation, the value of $W_R$ is 3.

Further, as described above if an incorrect authentication code provided by the intended recipient is unintentional, then the recipient has to send return the distributed sensitive data to the sender. Therefore, the sender performs the exact reverse-SMART (R-SMART) operation to rearrange the secret data again on the secret layer, so that the intended recipient may retrieve the sensitive data upon proper layer wise authentication.

Figure 6A:
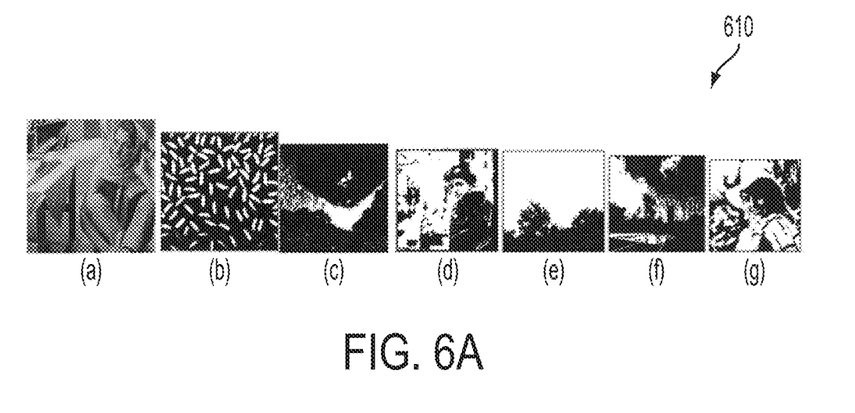
FIG. 6A illustrates an exemplary list of images having a cover image (a), a plurality of underlying layers (b), (c), (d), (e), (f), and the secret data layer (g), according to an implementation of the present disclosure.

For example, FIG. 6A illustrates an exemplary list of images 610 having a cover image (a), a plurality of underlying layers (b), (c), (d), (e), (f), and the secret data layer (g), according to an implementation of the present disclosure. In the example, image (a) represents a cover image, the images (b) (c), (d), (e) and (f) are the underlying images, and the last image (g) is the secret image. The images (b) (c), (d), (e), (f)

and (g) are embedded into the cover image (a). After the embedding operation, the images (b) (c), (d), (e), (f) and (g) become invisible.

Figure 6B:
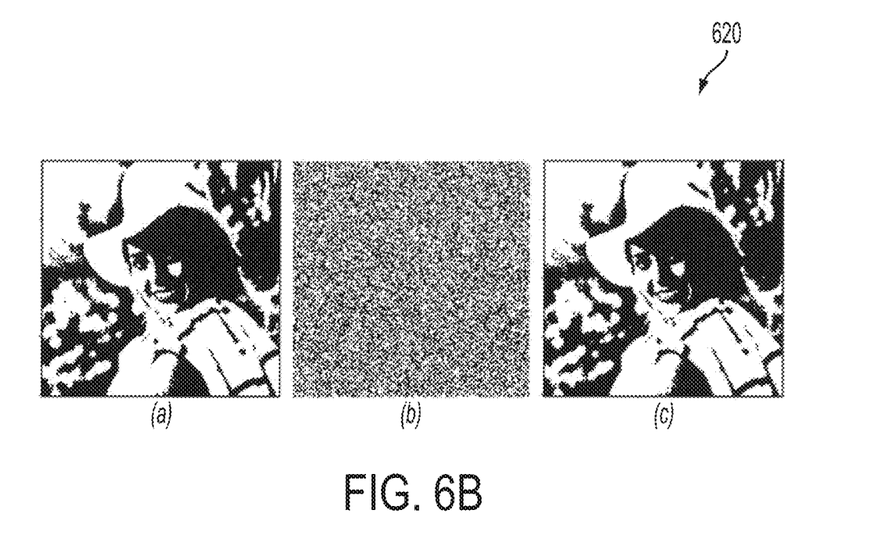
FIG. 6B illustrates plurality of layers having exemplary images, wherein (a) is an original secret layer, (b) extracted secret after SMART (Suspect Malicious Activity on Rich Tract) operation, and (c) is the secret layer after R-SMART operation, according to an implementation of the present disclosure.

Furthermore, FIG. 6B illustrates a plurality of layers 620 having exemplary images, where (a) is an original secret layer, (b) is an extracted secret layer after an exemplary SMART operation, and (c) is the secret layer after an exemplary R-SMART operation. In other words, the image (b) represents the exemplary sensitive data distribution among other layers and upon the successful operation, the secret data extracted by the intruder or any unauthorized user is of no use. However, as discussed above, if the incorrect authentication code provided by the intended recipient is unintentional, then the recipient has to return the distributed sensitive data to the sender. Therefore, the sender performs the exact reverse-SMART (R-SMART) operation to rearrange the secret data again on the secret layer. Thus, image (c) represents the secret layer after R-SMART operation.

Figure 7:
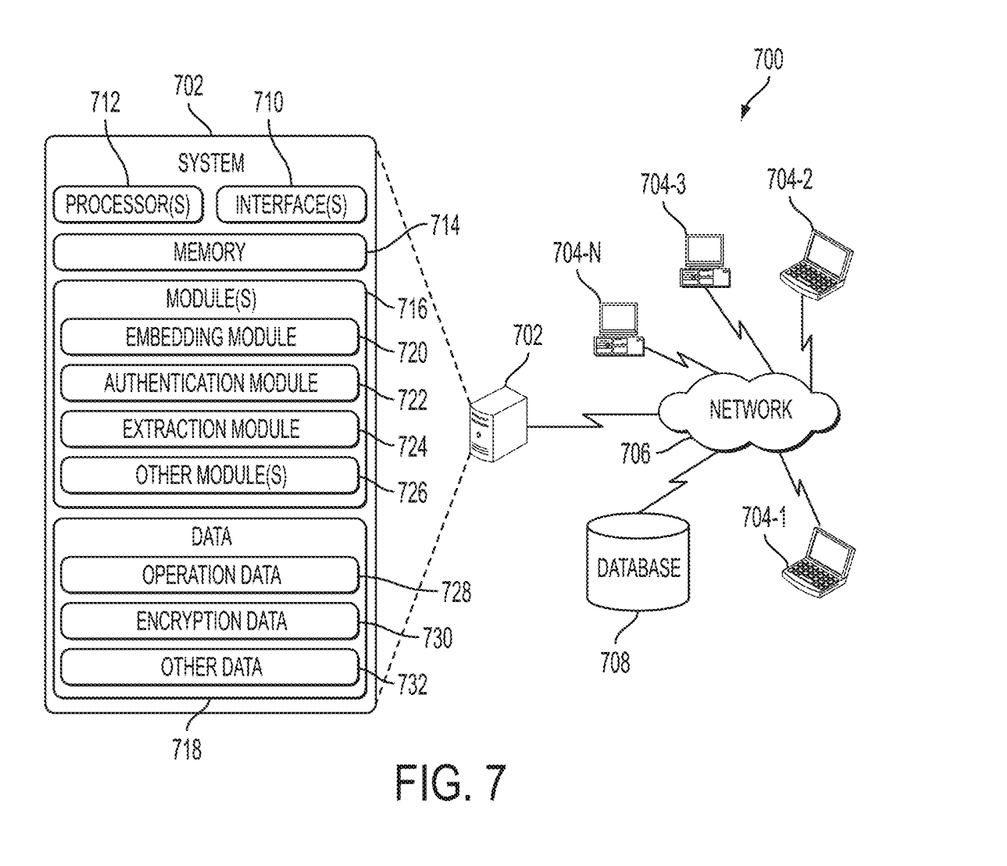
FIG. 7 illustrates a network implementing a computation system for providing multi-layer reversible data hiding, according to an implementation of the present disclosure.

FIG. 7 illustrates a network implementing 700 a computing system 702 for providing multi-layer reversible data hiding, according to an implementation of the present disclosure. The computing system 702 can be implemented as a variety of communication devices, such as a laptop computer, a notebook, a workstation, a mainframe computer, a server and the like. The computing system 702 described herein, can also be implemented in any network environment comprising a variety of network devices, including routers, bridges, servers, computing devices, storage devices, etc.

In one implementation, the computing system 702 is connected to one or more computing devices 704-1, 704-2 . . . 704-N, individually and commonly hereinafter referred to as device(s) 704, and a database 708, through a network 706. The devices 704 may be implemented as, but are not limited to, hand-held devices, laptops or other portable computers, tablet computers, mobile phones, personal digital assistants (PDAs), Smartphone, and the like. The devices 704 may be located within the vicinity of the computing system 702 or may be located at different geographic location as compared to that of the computing system 702. Further, the devices 704 may themselves be located either within the vicinity of each other, or may be located at different geographic locations.

The network 706 may be a wireless or a wired network, or a combination thereof. The network 706 can be a collection of individual networks, interconnected with each other and functioning as a single large network (e.g., the internet or an intranet). The network 706 can be implemented as one of the different types of networks, such as intranet, local area network (LAN), wide area network (WAN), the internet, and such. The network 706 may either be a dedicated network or a shared network, which represents an association of the different types of networks that use a variety of protocols, for example, Hypertext Transfer Protocol (HTTP), Transmission Control Protocol/Internet Protocol (TCP/IP), etc., to communicate with each other.

The database 708 may be implemented as, but not limited to, enterprise database, remote database, local database, and the like. The database 708 may be located within the vicinity of the computing system 702 and devices 704 or may be located at different geographic location as compared to that of the computing system 702 and devices 704. Further, a plurality of databases 708 may be located either within the vicinity of each other, or may be located at different geographic locations. Furthermore, the database 708 may be implemented inside the device 704 or inside the computing system 702.

In one implementation, the computing system 702 includes processor(s) 712. The processor 712 may be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in a memory.

The functions of the various elements shown in the figure, including any functional blocks labeled as "processor(s)", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), non-volatile storage. Other hardware, conventional and/or custom, may also be included.

In addition, the computing system 702 includes interface(s) 710. The interfaces 710 may include a variety of software and hardware interfaces that allow the computing system 702 to interact with the entities of the network 706, or with each other. The interfaces 710 may facilitate multiple communications within a wide variety of networks and protocol types, including wire networks, for example, LAN, cable, etc., and wireless networks, for example, WLAN, cellular, satellite-based network, etc.

The computation system 702 may also include a memory 714. The memory 714 may be coupled to the processor 712. The memory 714 can include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Further, the computing system 702 may include module(s) 716 and data 718. The modules 716 may be coupled to the processors 712 and amongst other things, include routines, programs, objects, components, data structures, etc., which perform particular tasks or implement particular abstract data types. The modules 716 may also be implemented as, signal processor(s), state machine(s), logic circuitries, and/or any other device or component that manipulate signals based on operational instructions.

Further, the modules 716 can be implemented in hardware, instructions executed by a processing unit 712, or by a combination thereof. The processing unit 712 can comprise a computer, a processor, a state machine, a logic array or any other suitable devices capable of processing instructions. The processing unit 712 can be a general-purpose processor which executes instructions to cause the general-purpose processor to perform the required tasks or, the processing unit can be dedicated to perform the required functions.

In another aspect of the present subject matter, the modules 716 may be machine-readable instructions (software) which, when executed by a processor/processing unit, perform any of the described functionalities. The machine-readable instructions may be stored on an electronic memory device, hard disk, optical disk or other machine-readable storage medium or non-transitory medium. In one implementation, the machine-readable instructions can be also be downloaded to the storage medium via a network connection.

In an implementation, the modules 716 include an embedding module 720, an authentication module 722, an extraction module 724, and other module(s) 726. The other module(s) 726 may include programs or coded instructions that supplement applications or functions performed by the computing system 702. Further, the data 718 may include operation data 728, encryption data 730, and other data 732. The other data 732, amongst other things, may serve as a repository for storing data that is processed, received, or generated as a result of the execution of one or more modules in the modules 716. Although the data 718 is shown internal to the computing system 702, it may be understood that the data 718 can reside in an external repository (not shown in the figure), which may be coupled to computing system 702.

In one implementation, the system 702 for providing multi-layer reversible data hiding may be provided. The system 702 includes an embedding module 720 that may be configured to identify a cover layer, a plurality of intermediate layers and a data layer. The embedding module 720 may further configured to calculate total number of layers including said cover layer and said data layer. Further, the embedding module 720 may configured to select a window size to process said cover media on said cover layer. To this end, the embedding module 720 may configured to validate each of said layers based on said window size of said cover media embedding module 720 that may be configured to embed data in a cover media.

In the present implementation, the system 702 includes an authentication module 722 that may be configured to provide an authentication key for each of the said layers. To this end, each of the layers may incorporate unique authentication key, which may be unlocked by only an authorized user.

In the present implementation, the system 702 includes an extraction module 724 that may be configured to select a window size of a cover media of same size as it may be selected during embedding process by the embedding module 720. The extraction module 724 may be further configured to receive appropriate authentication key corresponding to each of said layers, and in response to the receiving, provide data from said data layer upon successful authentication at each of said layers. The extraction module 724 may also be configured to distribute said sensitive data among all layers proportionally upon unsuccessful authentication at any of said layers.

In another implementation, the embedding module 720 may further configured to select the window size of W×Z dimension, wherein W may be taken as any integer value, and wherein Z may be determined based on the following equation:

$$Z = 1 + \left[ \frac{\text{Total number of layers to embed}}{\text{Number of LSBs consider to embed data}} \right]$$

In another implementation, the embedding module 720 may further configured to validate of each of said layers to ensure the dimension of the underlying layers remain below to the dimension of said cover media. In other words, the validation of each of said layers may be examined to ensure that the dimension of the underlying layers including the data layer must not exceed the dimension of the cover image.

In another implementation, the embedding module 720 may be further configured to validate of each of said layers based on the equation provided below:

$$\left( \left( \frac{P}{W} \times \frac{Q}{Z} \right) \times W \right) \leq ((M \times K) + \text{size } (M \times K) + \text{size (Authentication Key)})$$

where the dimension of said cover media is (P× Q), window size for processing said cover media is (W× Z), and the dimension of said underlying image is and W is any integer value.

Furthermore, in this respect, upon validation if each of said layers is a logical true by the above equation, then the underlying layer is typically not qualified to be embedded to the cover image. Thus, it may be provided that the dimension criteria is important in such embedding process.

In another implementation, the extraction module 724 may be configured to check the dimension of the embedded image. The extraction module 724 is also configured to extract the number of hidden layers such that the number of underlying layers including the secret layer.

In another implementation, the extraction module 724 may configured to distribute the sensitive data amongst each of said layers completely which may be referred as completion of one iteration (COI). Further, the completion of one iteration may be dependent on number of window processing as provided by the equation:

$$N_W = \left[ \frac{M_L}{W_R} \right]$$

where $N_w$ is the number of window processing needed for completion of one iteration (COI), $M_L$ is the maximum number of underlying layers including secret layer within the current window, and $W_R$ is the number of secret bits to be distributed within the current window.

It will be understood that the modules and the databases referred to in the previous sections are not necessarily utilized together in a single computing system. Rather, these modules are merely exemplary of the various modules that may be implemented within a computing system. Further, it will be understood that the computing system may include more modules than the ones described in this disclosure without departing from the scope of the present disclosure.

It will be appreciated that several of the above-disclosed and other features and functions, or alternatives thereof, may be desirably combined into many other different systems or applications. Various presently unforeseen or unanticipated alternatives, modifications, variations, or improvements therein may subsequently be made by those skilled in the art, which are also intended to be encompassed by the following claims.

What is claimed is:

1. A computer implemented system for providing a security scheme for multi-layer reversible data hiding, the system comprising:
   a processor;
   an embedding module coupled to the processor, wherein the embedding module is configured to embed data in a cover media, wherein the cover media comprises a cover layer having said cover media thereon, a data layer having said data thereon, and a one or more of intermediate layers disposed between the cover layer and said data layer, wherein the embedding module is configured to embed each of said one or more intermediate layers and said data layer sequentially based on a window size of said cover media;
   an authentication module coupled to the processor, wherein the authentication module is configured to provide an authentication key for each of the said one or more intermediate layers and said data layer; and
   an extraction module coupled to the processor, wherein the extraction module is configured to receive the authentication key corresponding to each of said one or more intermediate layers and said data layer, and in response to the receiving, provide, to a user, the data from said data layer upon successful authentication at each of said one or more intermediate layers and said data layer, and distribute said data among one or more of the one or more intermediate layers upon unsuccessful authentication at any of said one or more intermediate layers and said data layer.

2. The system of claim 1, wherein said embedding module is further configured to select said window size of W×Z dimension, wherein W is any integer value, and wherein Z is determined based on the equation:

$$Z = 1 + \left[\frac{\text{Total number of layers to embed}}{\text{Number of } LSBs \text{ consider to embed data}}\right]$$

where the total number of layers to embed comprises said one or more intermediate layers and said data layer.

3. The system of claim 1, wherein said embedding module is further configured to validate of each of said one or more intermediate layers and said data layer to ensure the dimension of each of said one or more intermediate layers and said data layer remains below to the dimension of said cover media.

4. The system of claim 1, wherein said embedding module is further configured to perform the validation of each of said one or more intermediate layers and said data layer based on the equation:

$$\left(\left(\frac{P}{W} \times \frac{Q}{Z}\right) \times W\right) \leq ((M \times K) + \text{size } (M \times K) + \text{size (Authentication Key)})$$

wherein the dimension of said cover media is (P× Q), window size for processing said cover media is (W× Z), the dimension of an underlying image of said one or more intermediate layers or said data layer is (M× K), size ( ) is a size of an array, and W is any integer value.

5. The system of claim 1, wherein said embedding module is further configured to embed said data on said data layer.

6. The system of claim 1, wherein the data includes an embedded image, and said extraction module is further configured to check the dimension of the embedded image.

7. The system of claim 6, wherein said extraction module is further configured to send the embedded image to a sender to rearrange the data that was distributed, upon unsuccessful authentication at any of said one or more intermediate layers and said data layer.

8. The system of claim 1, wherein said extraction module is further configured to extract the data after authentication of each of said one or more intermediate layers and said data layer.

9. The system of claim 1, wherein the distribution of the data is dependent on number of window processing as provided by the equation:

$$N_W = \left[\frac{M_L}{W_R}\right]$$

wherein $N_w$ is a number of window processing needed for completion of one of said one or more intermediate layers and said data layer, $M_L$ is a maximum number of underlying layers including said one or more intermediate layers and the data layer within a current window, and $W_R$ is a number of secret bits to be distributed within the current window.

10. A method for embedding data in a cover media in a computing environment having a processing unit, the method comprising:
   providing a plurality of layers including a cover layer, one or more intermediate layers, and a data layer that includes hidden data;
   selecting, based on a total number of said one or more intermediate layers and the data layer, a window size to process said one or more intermediate layers and said data layer;
   validating each of said one or more intermediate layers and said data layer based on a dimension of said cover media;
   providing an authentication key for each of said one or more intermediate layers and said data layer that were validated; and
   embedding each of said one or more intermediate layers and said data layer that were validated in said cover layer based on said window size.

11. The method of claim 10, wherein selecting said window size includes selecting said window size of W×Z dimension, wherein W is any integer value, and wherein Z is determined based on the equation:

$$Z = 1 + \left[\frac{\text{Total number of layers to embed}}{\text{Number of } LSBs \text{ consider to embed data}}\right]$$

where the total number of layers to embed comprises said one or more intermediate layers and said data layer that were validated.

12. The method of claim 10, wherein validating each of said one or more intermediate layers and said data layer includes validating to ensure the dimension of each of said one or more intermediate layers and said data layer remain at or below the dimension of said cover media.

13. The method of claim 10, wherein validating each of said one or more intermediate layers and said data layer is based on the equation:

$$\left(\left(\frac{P}{W} \times \frac{Q}{Z}\right) \times W\right) \leq ((M \times K) + \text{size } (M \times K) + \text{size (Authentication Key)})$$

wherein the dimension of said cover media is (P× Q), window size for processing said cover media is (W× Z), the dimension of an underlying image of said one or more intermediate layers or said data layer is (M× K), size ( ) is a size of an array, and W is any integer value.

14. The method of claim 10, wherein said hidden data includes an underlying image on the data layer.

15. The method of claim 10, wherein said data layer is the last layer in said plurality of layers.

16. The method of claim 10, wherein said authentication key is unique for each of said one or more intermediate layers and said data layer.

17. A method for extracting data from a cover media in a computing environment having a processing unit, the method comprising:
- receiving an authentication code corresponding to each of a plurality of layers associated with the cover media, wherein the plurality of layers includes a cover layer including said cover media thereon, one or more intermediate layers, and a final layer including hidden data thereon;
- authenticating each of said plurality of layers based on the corresponding authentication code, and
- providing, upon successful authentication at each of said plurality of layers, the hidden data from said final layer to a user.

18. The method of claim 17, further comprising distributing, upon an invalid authentication entry, the hidden data among the one or more intermediate layers.

19. The method of claim 18, wherein the distributing is dependent on number of window processing as provided by the equation:

$$N_W = \left[\frac{M_L}{W_R}\right]$$

wherein $N_w$ is a number of window processing needed for completion of one of said plurality of layers, $M_L$ is a maximum number of underlying layers including said one or more intermediate layers and the hidden layer within a current window, and $W_R$ is a number of secret bits to be distributed within the current window.

20. The method of claim 18, wherein, upon unsuccessful authentication at any of said plurality of layers, sending the cover media to a sender to rearrange the hidden data that was distributed.

21. The method of claim 17, wherein the hidden data is an embedded image, and further comprising checking a dimension of the embedded image.

22. The method of claim 17, further comprising extracting the hidden data after authenticating each of the cover layer, the one or more intermediate layers, and the final layer.

23. A non-transitory computer-readable medium having embodied thereon a computer program for executing a method for embedding data behind a cover media, the method comprising:
- providing a plurality of layers including a cover layer, one or more intermediate layers, and a secret layer with said data;
- selecting, based on total number of said one or more intermediate layers and said secret layer, a window size to process said cover media on said cover layer;
- validating each of said one or more intermediate layers and said secret layer based on said window size of said cover media;
- providing an authentication key for each of said one or more intermediate layers and said secret layer that were validated; and
- embedding each of said one or more intermediate layers and said secret layer that were validated based on said window size of said cover media.

24. A non-transitory computer-readable medium having embodied thereon a computer program for executing a method for extracting data from a cover media, the method comprising:
- receiving an authentication code corresponding to each of a plurality of layers associated with the cover media, wherein the plurality of layers includes a cover layer having said cover media thereon, a plurality of intermediate layers, and a secret layer having data thereon;
- authenticating each of said plurality of layers based on the corresponding authentication code and;
- providing, upon successful authentication at each of said plurality of layers, sensitive data from said secret layer to a user; and
- distributing, upon unsuccessful authentication at any of said layers, said sensitive data amongst one or more of said plurality of layers.

* * * * *